March 22, 1966 J. R. M. LONG ETAL 3,241,505
SYSTEM FOR REGULATING THE SUPPLY OF PULVERIZED
FUEL SLURRY TO A FURNACE
Filed July 17, 1963

INVENTORS:
JAMES R. M. LONG
JAMES JONAKIN
BY VIRGINIUS Z. CARACRISTI
ALEXANDER BOGOT

John F. Carney
ATTORNEY

United States Patent Office  3,241,505
Patented Mar. 22, 1966

3,241,505
SYSTEM FOR REGULATING THE SUPPLY OF PULVERIZED FUEL SLURRY TO A FURNACE
James R. M. Long, Thompsonville, James Jonakin, Simsbury, and Virginius Z. Caracristi and Alexander Bogot, West Hartford, Conn., assignors to Combustion Engineering, Inc., Windsor, Conn., a corporation of Delaware
Filed July 17, 1963, Ser. No. 295,657
2 Claims. (Cl. 110—22)

This invention relates to the supplying of fuel to a fuel burning means. More particularly, the invention relates to a novel method and apparatus for automatically supplying pulverized carbonaceous fuel and oil slurry to a furnace and for automatically regulating the density of the slurry mixture. The invention has particular utility as a means for supplementing the principal source of fuel in a fuel burning installation, as for example a blast furnace where coke is normally employed as the principal fuel.

For several years the steel industry has recognized the need for reducing the amount of coke used in blast furnaces due to the expense of such fuel. One method of reducing the volume of coke employed involves the injection of a supplemental fuel into the blast furnace in a manner which would enable the injected fuel to replace some of the coke. To date the technology of fuel injection had advanced to a point where as much as 30 percent of the coke charge can be replaced by a less expensive fuel. The quantity of charge that can be replaced varies with the type of fuel injected, such fuels including natural gas, oil or coal. It is commonly recognized that coal is the most favorable fuel for injection, however, the utilization of coal requires the employment of complex, expensive equipment inasmuch as the fuel must be injected as a dry powder into a pulverized furnace. Moreover, air is normally employed as a carrier for the powdered coal and, due to the fact that this air must be heated to an elevated temperature so as not to cool the atmosphere within the blast furnace, there is an ever present danger of the occurrence of coking of the coal or even ignition thereof within the conveying conduits which would be harmful and even disruptive of the system.

The present invention involves a novel method and apparatus for injecting powdered coal, or any other carbonaceous fuel, such as coke, in slurry form into blast furnace and thereby provide a means for reducing the amount of coke employed in such furnaces and therewith the overall expense of operation. While the use of carbonaceous fuel-oil slurry is not of itself new, the invention includes a novel method and apparatus for automatically controlling the supply of such slurry to the furnace and for maintaining the consistency thereof constant. The system provides for pulverizing and drying the raw carbonaceous fuel in a ball mill or other suitable pulverizing apparatus and then blowing the pulverized fuel into a cyclone separator wherein approximately 99 percent of the carbonaceous fuel dust is collected and then discharged into a mixing tank. In the mixing tank the separated carbonaceous fuel is mixed with residual oil in controlled proportions in accordance with the amount of slurry fed to the furnace. Continuous blending of the slurry consitutents is maintained within the mixing tank so that the consistency of the material fed to the furnace is constant.

It is therefore an object of this invention to provide an integrated system for automatically supplying fuel slurry to a furnace.

Another object of the invention is to provide a novel carbonaceous fuel slurry supply system incorporating automatic control means for maintaining the proper density of the slurry fed to the furnace.

Various other objects and advantages will appear from the following description of the embodiments of the invention, and the novel features will be particularly pointed out hereinafter in connection with the appended claims.

The invention will be understood from the following description when considered in combination with the accompanying drawing forming a part thereof wherein.

Figure 1:
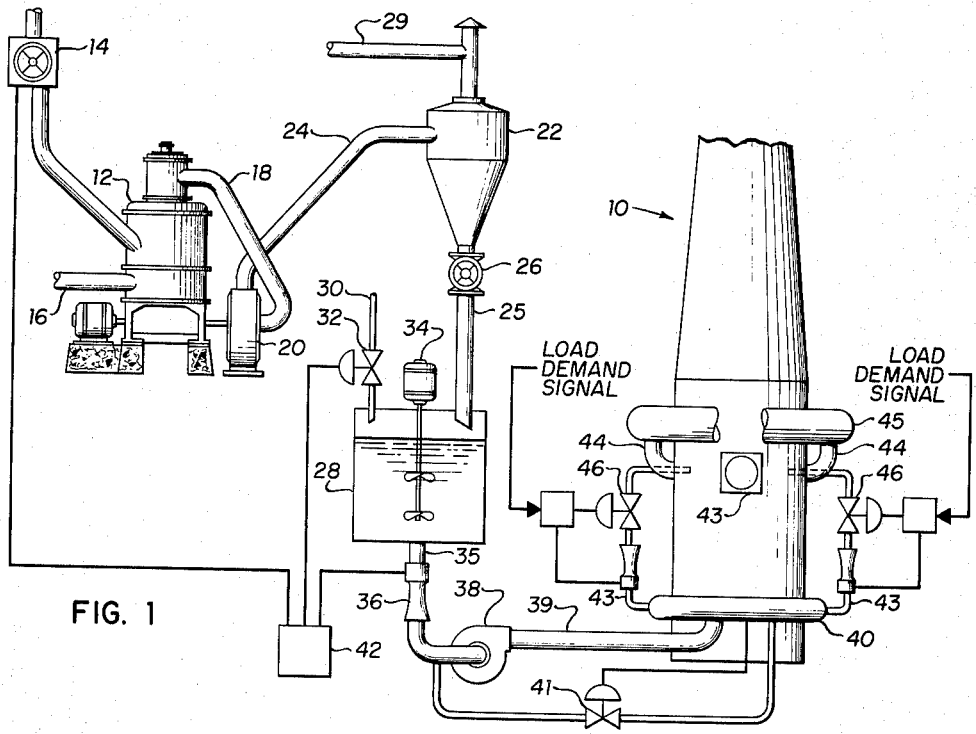
FIGURE 1 is a diagrammatic representation of the novel slurry supply system incorporating the preferred control means arrangement.

Referring now to the drawings there is shown in FIGURE 1 a carbonaceous fuel slurry supply system arranged to operate with a blast furnace 10 for supplementing the coke charge therein. The supply system includes a pulverizing mill 12 into which is fed raw carbonaceous fuel, such as coal, from a source (not shown) by means of an automatically controlled fuel feeding device 14. An air supply duct 16 communicates with the pulverizing mill 12 to provide air for carrying the fuel after it has been pulverized to a mixing tank 28. A conduit 18 connects to the outlet of the mill 12 and to the inlet of a pump 20 which withdraws fuel-laden air from the mill and delivers it to a separating device 22 through duct 24. The separator 22 may be any device capable of separating pulverized fuel and air, although in the preferred embodiment a separator of the centrifugal type, commonly known as a cyclone separator, is employed. Within the separator 22 the pulverized fuel and air are separated with the fuel being delivered by means of a power operated rotary feeder or air lock 26 to the mixing tank 28 through the discharge duct 25 and the air being returned to the air supply duct 16 through conduit 29.

The mixing tank 28 is adapted to receive large quantities of pulverized fuel. A fuel-oil input line 30 containing an automatically operated flow control valve 32 communicates with the tank for admitting fuel oil for the purpose of mixing or blending the oil and pulverized fuel into a slurry. Mixing is accomplished by means of an agitating device such as a rotary mixer 34 associated with the tank. The mixer 34 serves to blend the pulverized fuel and oil into a slurry of proper consistency. In blast furnace applications it has been determined that a slurry consisting of approximately 60 percent coal and 40 percent oil obtains the best results. However, in other applications, such as burner systems for steam generators or the like, slurries consisting of from 30 to 40 percent coal or coke and the remainder oil are most conducive for efficient operation. A discharge duct 35 communicates with the mixing tank 28 and serves to remove slurry therefrom by means of a constant speed slurry pump 38, the outlet 39 of which communicates with the slurry header 40 in the blast furnace supply system. Pressure within the slurry header 40 is maintained constant by means of the pressure control valve 41 positioned in by-pass relationship with the slurry pump 38. Conduit 43 connects the slurry header 40 to the blast furnace tuyere through the bustle pipe discharge lines 44. Air is supplied to lines 44 from header 45. Flow control valve 46 is interposed in line 43 and regulates the amount of slurry admitted to the blast furnace in response to the load demand thereon.

The means employed to regulate or control the slurry supplied to the furnace includes a flow sensing device 36 positioned in the mixing tank discharge duct 35 which senses the amount of slurry removed from the tank 28 in response to the load demand on the blast furnace 10 and transmits a signal to a control transmitter 42 which is, in turn, connected to the coal feeder 14 and to the oil supply control valve 32. The control feeder and the oil supply control valve are set to deliver proportionate amounts of coal and oil to obtain a slurry mixture of proper consistency in response to the signals received from the control transmitter 42. While the control system described here is electrical, it is to be understood that systems which are hydraulic or pneumatic in nature may also be employed or any combination thereof.

The operation of the system is as follows. When the control valve 46 is operated to admit slurry to the blast furnace, the flow from the mixing tank 28 through discharge duct 35 is measured by the flow sensing device 36 and a signal is transmitted to the control transmitter 42 which, in turn, transmits signals to the coal feeder 14 and the oil supply control valve 32 which are regulated to admit proportionate amounts of coal and oil to the system for maintaining a slurry of proper consistency. The coal feeder 14 delivers raw coal to the pulverizing mill 12 which reduces the coal to powdered form. Air admitted to the mill 12 through duct 16 picks up the powdered coal and delivers it through ducts 18 and 24 by means of the pump 20 to the separator 22 wherein the air-powdered coal mixture is separated with the coal being deposited in the mixing tank 28 by means of the air lock 26. In the mixing tank the proportionate amount of fuel oil is admitted through the supply line 30 thereby restoring the volume of slurry which had previously been removed.

Figure 2:
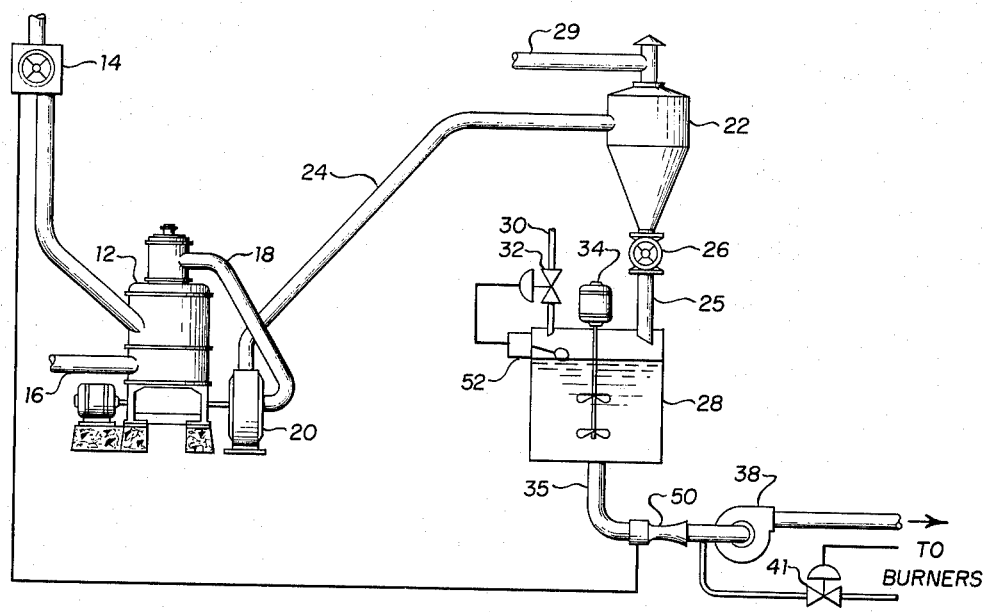
FIGURE 2 depicts substantially the same slurry means wherein another form of control means is employed.

The arrangement depicted in FIGURE 2 includes substantially the same slurry processing system as that shown in FIGURE 1, however, the means for controlling the process is altered in that it includes a flow sensing device 50 which measures the amount of slurry removed from the mixing tank 28 and transmits a signal in response thereto directly to the carbonaceous fuel feeder 14 thereby admitting the requisite amount of coal to the pulverizing mill 12 and thence to the mixing tank 28. A mixture level indicating device 52 is associated with the mixing tank 28 and is caused to transmit a signal to the oil supply control valve 32 in the input line 30 thereby causing fuel-oil to be admitted to the tank 28 to bring the mixture up to the predetermined level. The amount of fuel-oil which is admitted will be proportionate to the amount of slurry originally removed from the tank and the amount of carbonaceous fuel fed to the pulverizing mill and thereby the slurry consistency within the tank is maintained constant.

The herein disclosed system provides a means whereby slurry is made constantly available for use in desired applications. The process is continuous thereby obviating the need for producing the slurry in individual batches. The control system employed for regulating the process is simple, however, the arrangement is such that high efficiency of operation is obtained.

It will be understood that various changes in the details, materials, and arrangements of parts which have been herein described and illustrated in order to explain the nature of the invention, may be made by those skilled in the art with the principle and scope of the invention as expressed in the appended claims.

What is claimed is:

1. A fuel burning system arranged to operate employing fuel in the form of coal-oil slurry comprising a furnace; burner means arranged to operate in said furnace; a mixing tank; a coal pulverizer adapted to discharge pulverized coal to said mixing tank; means for feeding raw coal to said pulverizer; first signal responsive regulator means associated with said raw coal feeding means for regulating the supply of raw coal to said pulverizer; means for feeding oil to said mixing tank; second signal responsive regulator means associated with said oil feed means for regulating the amount of oil passed to said mixing tank; agitator means operative in said mixing tank for mixing the coal and oil supplied thereto into a slurry; means for supplying coal-oil slurry from said mixing tank to said burner means; first contol means for operating said slurry supply means to feed slurry to said burner means in response to the load demand thereon; means for sensing the amount of coal-oil slurry removed from said mixing tank and for emitting a signal in response thereto; and second control means including means operable to simultaneously actuate said first and second regulator means for passing predetermined amounts of coal and oil in response to the signal emitted by said slurry supply sensing means.

2. The organization of claim 1 wherein said slurry supply sensing means includes a flow sensor associated with said slurry supply means for sensing the amount of slurry passed by said supply means and for emitting a signal in response thereto; and said second control means comprises means for simultaneously transmitting signals to said first and second regulator means in response to the amplitude of the signal received from said slurry supply flow sensor.

References Cited by the Examiner

UNITED STATES PATENTS

| 2,430,085 | 11/1947 | Spencer et al. | 44—51 |
|---|---|---|---|
| 2,517,074 | 8/1950 | Ames | 158—12 |
| 2,880,654 | 4/1959 | Henry | 241—34 |
| 2,885,154 | 5/1959 | Eastman et al. | 241—34 |
| 3,092,337 | 6/1963 | Patterson | 241—34 |

FREDERICK L. MATTESON, JR., *Primary Examiner.*

MEYER PERLIN, *Examiner.*